US011153842B2

(12) United States Patent
Wirola et al.

(10) Patent No.: US 11,153,842 B2
(45) Date of Patent: Oct. 19, 2021

(54) DETERMINING RADIO NODE IDENTIFIERS

(71) Applicant: HERE Global B.V., Eindhoven (NL)

(72) Inventors: Lauri Aarne Johannes Wirola, Tampere (FI); Jari Tapani Syrjärinne, Tampere (FI)

(73) Assignee: Here Global B.V., Eindhoven (NL)

( * ) Notice: Subject to any disclaimer, the term of this patent is extended or adjusted under 35 U.S.C. 154(b) by 0 days.

(21) Appl. No.: 16/647,101

(22) PCT Filed: Sep. 15, 2017

(86) PCT No.: PCT/EP2017/073264
§ 371 (c)(1),
(2) Date: Mar. 13, 2020

(87) PCT Pub. No.: WO2019/052653
PCT Pub. Date: Mar. 21, 2019

(65) Prior Publication Data
US 2020/0213966 A1 Jul. 2, 2020

(51) Int. Cl.
*G01S 1/04* (2006.01)
*H04W 64/00* (2009.01)
(Continued)

(52) U.S. Cl.
CPC ............. *H04W 64/00* (2013.01); *G01S 1/042* (2013.01); *G01S 1/0428* (2019.08); *G01S 5/0252* (2013.01); *H04W 4/33* (2018.02)

(58) Field of Classification Search
CPC ....... H04W 64/00; H04W 4/33; H04W 84/12; H04W 4/90; H04W 4/029; H04W 88/08;
(Continued)

(56) References Cited

U.S. PATENT DOCUMENTS 8,189,618 B2   5/2012  Dhanapal et al.
9,198,137 B2  11/2015  Koskela et al.
(Continued)

FOREIGN PATENT DOCUMENTS

CN       105208551 A    12/2015
EP          3029972 A1    6/2016
WO   WO 2016/073215 A1    5/2016

OTHER PUBLICATIONS

Suining, H. et al., *Indoor Localization and Automatic Fingerprint Update with Altered AP Signals*, IEEE Transactions on Mobile Computing, vol. 16, No. 7 (Jul. 2017) 1897-1910.
(Continued)

*Primary Examiner* — Fred A Casca
(74) *Attorney, Agent, or Firm* — Alston & Bird LLP

(57) ABSTRACT

A method is disclosed comprising: generating a radio map for a radio node (140), wherein the radio node is configured with a set of one or more transmission parameters from a plurality of sets of one or more transmission parameters; and associating the radio map with identifier information, wherein at least a part of the identifier information depends on the set of one or more transmission parameters from the plurality of sets of one or more transmission parameters. It is further disclosed an according apparatus, computer program and system.

14 Claims, 7 Drawing Sheets

(51) Int. Cl.
*H04W 4/33* (2018.01)
*G01S 5/02* (2010.01)
(58) Field of Classification Search
CPC .... H04W 88/02; G01S 1/0428; G01S 5/0252; G01S 1/042; G01S 19/46; G01S 5/02; G01S 5/0081; G01S 5/0242; H04B 17/318; G06F 3/0481
See application file for complete search history.

(56) References Cited

U.S. PATENT DOCUMENTS

| | | |
|---|---|---|
| 9,398,422 B2 | 7/2016 | Zampini, II |
| 9,538,320 B2 | 1/2017 | Mangold et al. |
| 2007/0149230 A1 | 6/2007 | Song et al. |
| 2012/0225663 A1 | 9/2012 | Gupta et al. |
| 2014/0011518 A1* | 1/2014 | Valaee ................ H04W 4/33 455/456.1 |
| 2016/0161592 A1* | 6/2016 | Wirola ................ G01S 5/0252 702/150 |
| 2016/0302033 A1 | 10/2016 | Cardno |

OTHER PUBLICATIONS

Woolley, M., *How to Configure UUID, Major and Minor Attributes in Sensortag IBeacon* [online] [retrieved Mar. 31, 2017]. Retrieved from the Internet: https://e2e.ti.com/support/wireless_connectivity/bluetooth_low_energy/f/538/t/337291 (dated at least as early as Mar. 31, 2017) 7 pages.

International Search Report and Written Opinion for Application No. PCT/EP2017/073264 dated Jun. 7, 2018, 14 pages.

\* cited by examiner

DETERMINING RADIO NODE IDENTIFIERS

CROSS-REFERENCE TO RELATED APPLICATIONS

This application is a national phase entry of International Application No. PCT/EP2017/073264, filed Sep. 15, 2017, the entire contents of which are incorporated herein by reference.

FIELD

The following disclosure relates to the field of indoor positioning, and more particularly relates to systems, apparatuses, and methods for configuring radio node identifiers of radio nodes comprised by indoor positioning systems.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection.

To setup indoor positioning in a building, the radio environment in the building needs to be surveyed. This phase is called radiomapping. In the radiomapping phase samples containing geolocation (like latitude, longitude, altitude; or x, y, floor) and radio measurements (Wi-Fi and/or Bluetooth radio node identities and signal strengths). Having these samples allows understanding how the radio signals behave in the building. This understanding is called a radio map. The radio map enables localization capability to devices. When they observe varying radio signals, the signals can be compared to the radio map resulting in the location information.

The radio samples for the radio map may be collected with special software tools or crowd-sourced from the user devices. While automated crowd-sourcing can enable indoor localization in large amount of buildings, manual data collection using special software tools may be the best option, when the highest accuracy is desired.

SUMMARY

Yet another aspect of the modern Bluetooth radio node respectively beacon systems is beacon monitoring and management. The key aspect of these systems may be as follows:

Hubs are deployed throughout the venue so that each beacon can communicate with at least one hub. The hubs, on the other hand, are connected to a monitoring/management server via a gateway hub, which is essentially a wired/wireless router. The hubs may be connected to the gateway hub through cable (e.g. Ethernet) or wirelessly (e.g. Wi-Fi, Cellular). Additionally or alternatively, a plurality of radio nodes (e.g. beacons) may for instance form a mesh communication network. In such a case, it is possible that only a single gateway hub is required. Further, the radio nodes may be connected to the single gateway hub, e.g. wirelessly (e.g. Wi-Fi, Cellular). The radio nodes forming the mesh communication network may communicate (e.g. transmit information) with each other. The gateway hub connected to the radio nodes forming the mesh communication network is further connected to a monitoring/management server.

The beacon monitoring refers to monitoring the beacon characteristics most typically via one-way communications by the hubs. The beacons may e.g. periodically broadcast their battery states, which transmissions are captured by the hubs and further routed to the monitoring/management server for analysis and visualization. The beacon management, on the other hand, refers to being able to perform two-way communication with the hubs and beacons. With a beacon management system e.g. the beacon transmit power can be re-configured remotely or the advertisement message changed, when needed. The server managing/monitoring the hub and/or beacon constellations can be a virtual server operated in a cloud (e.g. AWS, Azure), or it can be also a physical local server constituting a self-hosted, high-security system. However, re-configuring the beacons transmit power changes signals transmitted by said beacons. As a result, a radio map used for indoor positioning and/or floor detection may change as well. Thus, by re-configuring the beacons transmit power may result in low positioning performance.

It is thus, inter alia, an object of the invention to achieve a solution for being able to maintain positioning performance in indoor positioning and/or floor detection systems with changeable transmission parameters.

According to a first exemplary aspect of the present invention, a method is disclosed, the method, performed by at least one first apparatus, comprising:
  generating a radio map for a radio node, wherein the radio node is configured with a set of one or more transmission parameters from a plurality of sets of transmission parameters; and
  associating the radio map with identifier information, wherein at least a part of the identifier information depends on the set of one or more transmission parameters from the plurality of sets of one or more transmission parameters.

This method may for instance be performed and/or controlled by a server or a hub (e.g. of a venue). For instance, the method may be performed and/or controlled by using at least one processor of the server or the hub.

According to a second exemplary aspect of the present invention, a method is disclosed, the method, performed by at least one second apparatus, comprising:
  transmitting identifier information according to a set of one or more transmission parameters from a plurality of sets of one or more transmission parameters, wherein the identifier information allows a radio node of the venue to be identified, wherein at least a part of the identifier information depends on the set of one or more transmission parameters from the plurality of sets of one or more transmission parameters.

This method may for instance be performed and/or controlled by a radio node (e.g. of the venue). For instance, the method may be performed and/or controlled by using at least one processor of the radio node.

According to a third exemplary aspect of the present invention, a method is disclosed, the method, performed by at least one third apparatus, comprising:
  determining a position based at least partially on a radio map for a radio node that is configured according to a set of one or more transmission parameters from a plurality of sets of one or more transmission parameters, wherein the radio map is associated with identifier information allowing the radio node of the venue to be identified, and wherein at least a part of the identifier information depends on the set of one or more transmission parameters from the plurality of sets of one or more transmission parameters.

This method may for instance be performed and/or controlled by an electronic device or a server (e.g. of the venue). For instance, the method may be performed and/or controlled by using at least one processor of the electronic device or the server.

According to a further exemplary aspect of the invention, a computer program is disclosed, the computer program when executed by a processor causing an apparatus, for instance a server, to perform and/or control the actions of the method according to the first and/or second and/or third exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first and/or second and/or third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first and/or second and/or third exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the present invention, a system is disclosed, comprising:
at least one first apparatus according to any aspect of the invention as disclosed above, at least one second apparatus according to any aspect of the invention as disclosed above, and at least one third apparatus according to any aspect of the invention as disclosed above, wherein the at least one third apparatus is configured to perform and/or control a position estimation in a venue based on a radio map, wherein the radio map is associated with identifier information allowing the at least one second apparatus of a venue to be identified, wherein at least a part of the identifier information depends on a set of one or more transmission parameters from a plurality of sets of one or more transmission parameters.

In the following, exemplary features and exemplary embodiments of all aspects of the present invention will be described in further detail.

The radio node may for instance be comprised by the venue, e.g. by an infrastructure of the venue. Such a radio node of the venue may for instance be a beacon used for indoor positioning and/or floor detection, e.g. according to BT-(Bluetooth) and/or BLE- (Bluetooth Low Energy) specification, or may for instance be a Wi-Fi Access Point for indoor positioning and/or floor detection, e.g. according to the WLAN-(Wireless Local Area Network) specification). Indoor positioning and/or floor detection may for instance be performed and/or controlled based on a radio map. The radio node of the venue may for instance comprise or be connectable to a transceiver, e.g. according to the BT-, BLE, and/or WLAN-specification to provide wireless-based communication. The radio node of the venue may for instance use such a transceiver for transmitting and/or broadcasting one or more signals, e.g. comprising one or more information, e.g. identifier information.

The venue may for instance be a building, shopping mall, office complex, public accessible location (e.g. station, airport, university or the like), to name but a few non-limiting examples.

The set of transmission parameters may for instance comprise one or more transmission parameters.

The radio map may for instance be generated based at least partially on one or more radio measurements gathered (e.g. measured), e.g. by one or more further radio nodes, e.g. of the venue. The radio map may for instance be generated based at least partially on one or more radio measurements collected (e.g. measured) manually, e.g. by an electronic device or specially equipped tools for collecting such one or more radio measurements. For instance, the one or more radio measurements may be collected manually by surveying a venue, e.g. manually collecting one or more radio measurements at a plurality of locations in the venue.

The one or more radio measurements may for instance be gathered (e.g. measured) based on one or more signals sent by the one or more further radio nodes. The one or more signals may for instance be transmitted according to the set of one or more transmission parameters of the plurality of sets of one or more transmission parameters.

Further, the location (e.g. horizontal and/or vertical location) of the venue, where a respective radio measurement of the one or more radio measurements is gathered, may for instance be gathered as well. The location may for instance be represented by a position information. The respective radio measurement of the one or more radio measurements and the corresponding position information may for instance form a fingerprint. A plurality of such fingerprints gathered at e.g. different locations, e.g. of the venue, may for instance be used to generate the radio map.

The generated radio map is associated with identifier information. At least a part of the identifier information depends on the set of one or more transmission parameters from the plurality of sets of one or more transmission parameters. In this way, the generated radio map associated with the identifier information can be provided dependent on the identifier information. In case the set of one or more transmission parameters from the plurality of sets of one or more transmission parameters changes, another radio map is associated with the changed set of one or more transmission parameters.

According to an exemplary embodiment of all exemplary aspects of the present invention, the method further comprises:

determining the identifier information based on the set of one or more transmission parameters from the plurality of sets of one or more transmission parameters, wherein the identifier information allows the radio node of the venue to be identified.

The identifier information is determined based on the set of one or more transmission parameters. The identifier information may for instance be indicative of the radio node, e.g. of the venue. Thus, the determined identifier information may be different from another identifier information, which is determined based on a further set of one or more transmission parameters, which is different from the one used for determining the identifier information, while both identifier information are determined for the same radio node (e.g. of the venue). Alternatively, the determining of the identifier information may for instance be performed manually. It must be ensured that the determined identifier information allow the radio node to be identified and the determined identifier information must be different for each (possible) set of one or more transmission parameters, based on which the identifier information is determined.

It will be understood that the identifier information may for instance be determined based on further information, not exclusively based on the set of one or more transmission parameters of the plurality of sets of one or more transmission parameters.

The generated radio map may for instance be outputted together with the determined identifier information, e.g. to a memory for storing the generated radio map together with the identifier information.

The method according to the first exemplary aspect may for instance be repeated for each set of the plurality of sets of one or more transmission parameters, which may for instance be pre-defined for the venue. In this way, e.g. for each set of the plurality of sets of one or more transmission parameters, a radio map for a radio node of the venue is generated. In case the venue comprises more than one radio nodes, for each of the more than one radio nodes of the venue one radio map is generated, wherein one radio map for the radio node of the venue is generated for each set of the plurality of sets of one or more transmission parameters.

According to an exemplary embodiment of all exemplary aspects of the present invention, the set of one or more transmission parameters from the plurality of sets of one or more transmission parameters comprise one or more of the following parameters i) to iii):

i) a transmission power parameter;
ii) one or more transmission channel parameters; and
iii) a transmission interval parameter.

The transmission power parameter may for instance be indicative of a transmission power of the radio node. The transmission power parameter may for instance represent one or more different transmission powers, which may for instance be used for a communication link between, e.g. the radio node and an electronic device. In particular, a transmission power parameter may for instance be indicative of a transmission power, e.g. a value in the unit dBm. For instance, a transmission power parameter may represent one of e.g. six possible transmission power parameters (e.g. which may for instance be pre-defined according to e.g. requirements of an indoor positioning system of a venue). A transmission power parameter may for instance represent one of the following transmission powers 0 to 6: 1) 0 dBm (1 mW transmission power); 2) 5 dBm (approx. 3.2 mW transmission power); 3) 10 dBm (10 mW transmission power); 4) 15 dBm (approx. 31.6 mW transmission power); 5) 20 dBm (100 mW transmission power); or 6) 30 dBm (1000 mW transmission power).

The one or more transmission channel parameters may for instance be indicative of one or more channels the radio node uses for communicating with another device, e.g. an electronic device. As a minimum, one channel may for instance be used. Further, more than one channel may for instance be used for communicating with another device. For instance, a transmission channel parameter may represent one of e.g. seven different combinations of possible transmission channels (e.g. which may for instance be pre-defined, as aforementioned corresponding to the transmission power parameter). For instance, it may be chosen between three different transmission channels, e.g. referred to as transmission channels 37, 38 and 39. Any combination between the three transmission channels may for instance be possible. Thus, a transmission parameter may for instance represent one of the following parameters 1 to 7, wherein the exemplary transmission channels 37, 38 and 39 are used in this non-limiting example: 1) transmission channel 37; 2) transmission channel 38; 3) transmission channel 39; 4) transmission channels 37 and 38; 5) transmission channels 37 and 39; 6) transmission channels 38 and 39; or 7) transmission channels 37, 38 and 39.

The transmission interval parameter may for instance be indicative of a transmission interval of the radio node, e.g. how often the radio node transmits e.g. an advertisement packet that notifies nearby devices (e.g. electronic devices) about the radio nodes existence and on which channel it transmits. Based on the transmission interval parameter, e.g. an electronic device being involved in a communication with the radio node, may for instance activate (e.g. turn power on) means for transmitting and/or receiving (e.g. a transceiver) only if one or more signals being sent from the radio node can be received. This may for instance reduce the energy consumption of such an electronic device. The transmission interval parameter may for instance be indicative of a transmission interval, e.g. a value in the unit Hz. For instance a transmission interval parameter may represent one of e.g. six possible transmission interval parameters (e.g. which may for instance be pre-defined, as aforementioned corresponding to the transmission power parameter). The transmission interval parameter may for instance represent one of the following transmission intervals 0 to 6: 1) 1 Hz transmission interval; 2) 2 Hz transmission interval; 3) 3 Hz transmission interval; 4) 4 Hz transmission interval; 5) 5 Hz transmission interval, or 6) 6 Hz transmission interval.

According to an exemplary embodiment of all exemplary aspects of the present invention, at least a part of the identifier information comprises ownership information, wherein the ownership information is indicative of one or more radio nodes of a company or an owner of the one or more radio nodes, and at least another part of the identifier information comprises instance information, wherein the instance information is indicative of an identification of a radio node of the one or more radio nodes of the company or the owner of the one or more radio nodes.

Thus, the company or the owner may for instance be identified at first, wherein the company of the owner may for instance have more than one beacons. Then, within all radio nodes belonging to the company or the owner, a specific radio node (e.g. the radio node) may for instance be identified based on the instance information of the identifier information.

According to an exemplary embodiment of all exemplary aspects of the present invention, the information is divided into a plurality of upper bits and a plurality of lower bits.

The plurality of upper bits of the instance information may for instance comprise at least two bits. The plurality of lower bits of the instance information may for instance comprise at least two bits. The total length of the plurality of upper bits and/or the plurality of lower bits of the instance information may for instance be pre-defined or determined according to pre-defined rules. For instance, the total length of the plurality of lower bits of a identifier information (e.g. the identifier information) of a beacon according to BLE communication standard may be 4 or 8 bits, or 1, 2, 3, 4, 5, or 6 bytes. The total length of the plurality of lower bits of a identifier information (e.g. the identifier information) may for instance depend on the protocol used for broadcasting the identifier information by the radio node.

According to an exemplary embodiment of all exemplary aspects of the present invention, the set of one or more transmission parameters from the plurality of sets of one or more transmission parameters is associated with a discrete value, wherein the set of one or more transmission parameters comprises a combination of more than one transmission parameters, and wherein the discrete value is indicative of a value from a finite number of values.

The discrete value may for instance be associated with one or more transmission parameters in a memory, e.g. a database. Such a database may for instance comprise a look-up table, wherein a plurality of discrete value may for instance be associated with one or more transmission parameters. Further, the discrete value may for instance be associated with a set of one or more transmission parameters from the plurality of sets of one or more transmission parameters in the memory. For instance, corresponding to the set of one or more transmission parameters, a discrete value may be associated with the set of one or more transmission parameters, wherein based on the discrete value, the set of one or more transmission parameters may for instance be identifiable. For instance, a set of one or more transmission parameters (e.g. the set of one or more transmission parameters) may for instance be chosen to be provided, e.g. to a radio node (e.g. the radio node) of the venue and/or an electronic device, the discrete value being associated with the set of one or more transmission parameters may for instance be determined corresponding to the associations e.g. in the look-up table stored in the memory.

The finite number of values of the discrete value may for instance be corresponding to the number of possible combinations of combining the one or more respective transmission parameters with each other, or corresponding to the number of the plurality of sets of one or more transmission parameters.

The discrete value may for instance be represented by a code, a letter or the like to name but a few non limiting examples. For instance, the discrete value may be represented by an integer value. The integer value may for instance be transformed into a binary value. Further, the discrete value may for instance be a hexadecimal value. The hexadecimal value may for instance be transformed into a binary value. Alternatively, the discrete value may for instance be represented by a binary value. It will be understood that the discrete value being represented by a code can be transformed into a binary or hexadecimal value as well.

The discrete value may for instance be representing 16 different values, e.g. in a hexadecimal value bit ranging from 0 to F. Each value of the hexadecimal value bit may for instance represent a set of one or more transmission parameters from the plurality of sets of one or more transmission parameters.

According to an exemplary embodiment of all exemplary aspects of the present invention, the instance information comprises the discrete value.

The discrete value may for instance be inserted into the instance information of the identifier information. For instance, the discrete value may for instance be represented by one or more bits of the identifier information located in the instance information of the identifier information. The one or more bits of the identifier information may for instance be placed at a pre-defined or determined according to pre-defined rules position of the identifier information.

The discrete value represented by one or more bits may for instance be inserted into the plurality of lower bits of the identifier information. Alternatively, the discrete value represented by one or more bits may for instance be comprised by the plurality of lower bits of the identifier information.

The at least one first apparatus may for instance a server be or a hub, e.g. comprised by the venue or being connectable to at least one entity of the venue so that a communication connection between the at least one entity of the venue and the hub or the server can be established, e.g. via the Internet.

At least one hub may for instance be deployed in the venue so that each apparatus (e.g. radio node) in the venue can communicate with the at least one hub.

In case the venue comprises more than one of such hubs and more than one radio nodes of the venue, the more than one radio nodes may for instance be deployed in the venue so that each radio node of said radio nodes of the venue can communicate with the at least one hub.

The hub may for instance be able to communicate with the at least one first apparatus. The hub may for instance be able to communicate with a server, e.g. via a wirebound or wireless communication connection. The set of one or more transmission parameters of the plurality of sets of one or more transmission parameters may for instance be determined by the server or the hub. After the determining of the set of one or more transmission parameters, the determined set of one or more transmission parameters may for instance be provided, e.g. output. The set of one or more transmission parameters may for instance be output to at least one apparatus, e.g. at least one second apparatus, or to another entity (e.g. in the venue or in a cloud), which transmits the determined one or more pieces of respective transmission parameters to the at least one second apparatus.

The at least one second apparatus may for instance a radio node. The at least one third apparatus may for instance be a radio node of the venue. The radio node may for instance be a beacon.

The at least one third apparatus may for instance an electronic device. The electronic device may for instance be portable (e.g. a smartphone, tablet, portable navigation device, to name but a few non-limiting examples).

The identifier information may for instance be obtained from an electronic device that may for instance request indoor positioning and/or floor detection (e.g. position estimation) to be performed. The obtained identifier information may for instance be comprised by a positioning request. Such a positioning request may for instance stem from such an electronic device.

For instance, in order obtain the identifier information, which is needed to provide the radio map that is associated with the obtained identifier information, to perform indoor positioning and/or floor detection, the electronic device requesting indoor positioning and/or floor detection may provide the identifier information to a server. Then, the server can provide the radio map associated with the identifier information. Since the electronic device may acquire the identifier information based on a signal broadcasted by a radio node of a venue—the identifier information may be comprised by the signal broadcasted—, the electronic device may use this identifier information and comprise it in a positioning request for requesting indoor positioning and/or floor detection to be performed. The server receiving the positioning request may then determine the identifier information based on the received positioning request comprising the identifier information. Further, the server may provide the corresponding radio map associated with that identifier information, e.g. to the electronic device requesting indoor positioning and/or floor detection to be performed.

The electronic device may for instance comprise or be connectable to a transceiver, e.g. according to the BT-, BLE-, and/or WLAN-specification to provide wireless-based communication. The electronic device may for instance use such a transceiver for obtaining (e.g. receiving) the plurality of fingerprints.

To provide the radio map, for instance the obtained identifier information is used for determining the radio map that is associated with the obtained identifier information. Then, this determined radio map is provided, e.g. to the electronic device requesting indoor positioning and/or floor detection to be performed (e.g. by the positioning request).

According to an exemplary embodiment of the third aspect of the present invention, the position is determined further based on one or more radio measurements gathered by an apparatus whose position is to be determined.

For instance, an electronic device may for instance gather the one or more radio measurements. Then, the electronic device may for instance determine its position, e.g. in the venue based on the provided radio map and on the one or more radio measurements.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
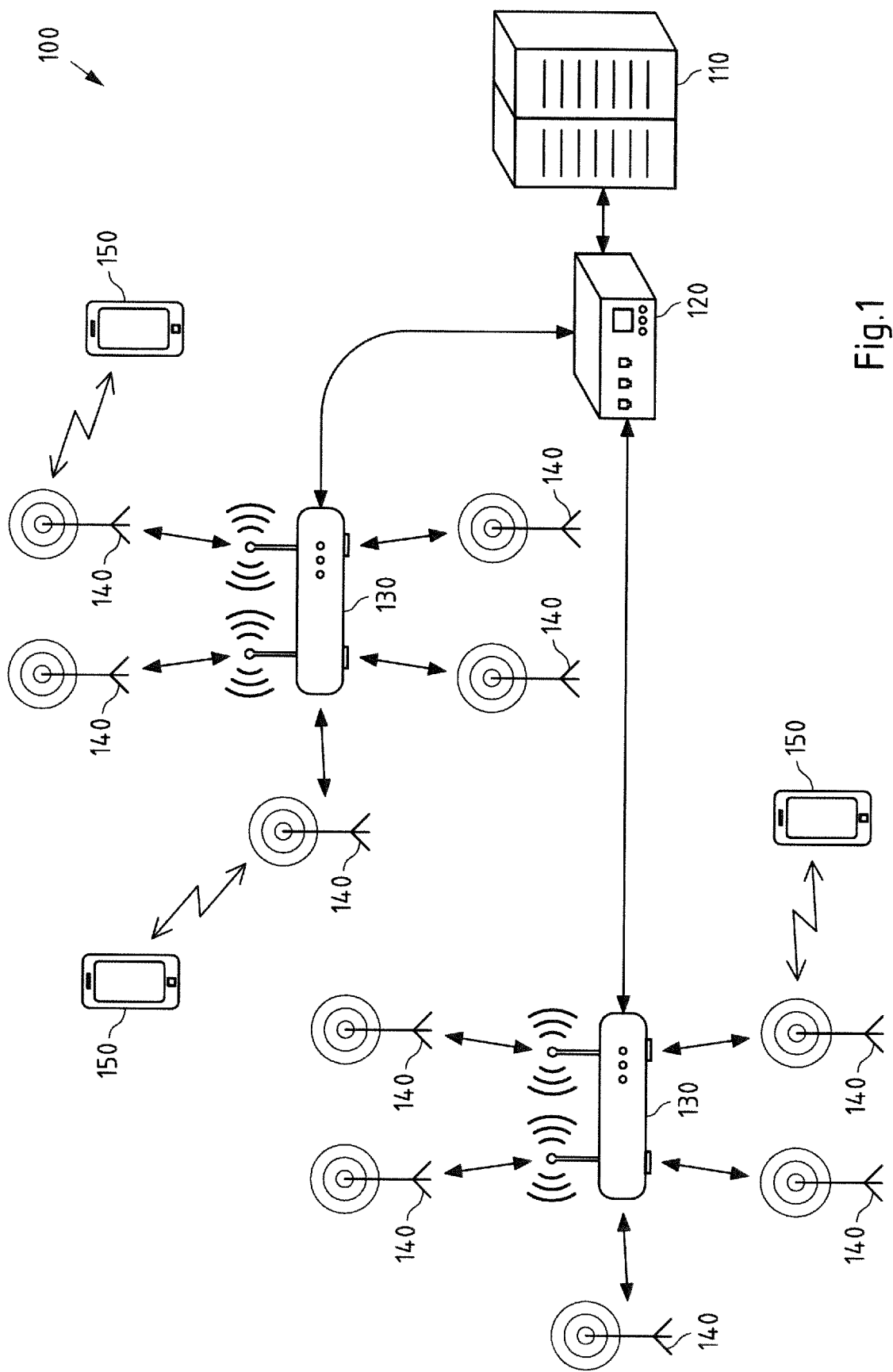
FIG. 1 a schematic block diagram of a system according to an exemplary aspect of the present invention.

FIG. 1 is a schematic high-level block diagram of a system 100 according to an exemplary aspect of the present invention. System 100 comprises a server 110, a gateway hub 120, one or more hubs 130, one or more radio nodes 140, at hand embodied as beacons, and one or more electronic devices 150, at hand embodied as mobile devices. Such a mobile device may for instance be e.g. a smartphone, tablet, portable navigation device, IoT (Internet of Things) device to name but a few non-limiting examples. One or more of the aforementioned entities of the system 100 may for instance be comprised (e.g. installed and/or located) in a venue.

The server 110 may alternatively be embodied as a server cloud (e.g. a plurality of servers connected, e.g. via the Internet and providing services at least partially jointly). Further, the one or more radio nodes 140 may for instance be embodied as one or more IoT devices. The gateway hub 120 and/or the hubs 130 may for instance be optional. In this case, the server 110 may be connected to the one or more radio nodes (e.g. beacons) e.g. via the Internet or via a wirebound or wireless communication connection (e.g. according to the Wi-Fi, BT, and/or BLE communication standard). Alternatively, the radio nodes 140 may for instance form a mesh communication network. In such a case, it is possible that only a single gateway hub 120 is comprised by the system 100. Further, the radio nodes 140 may be connected to the single gateway hub 120, e.g. wirelessly (e.g. Wi-Fi, Cellular). The radio nodes 140 forming the mesh communication network may communicate (e.g. transmit information) with each other. The gateway hub 120 connected to the radio nodes 140 forming the mesh communication network is further connected to the server 110, which may for instance be embodied as a monitoring respectively management server for the radio nodes 140.

Alternatively, the server 110 may for instance be optional. In this case, at least one of the hubs 130 may for instance provide the functionalities and/or services, which the server 110 provides in the other alternative embodiment, e.g. to the one or more radio nodes 140.

According to embodiments of the present invention, the server 110 may for instance monitor and/or manage the one or more radio nodes 140 of the venue. The server 110 may for instance obtain or determine one or more transmission parameters. The one or more transmission parameters may for instance be obtained from a database, e.g. comprised by or connected to the server 110. One or more obtained transmission parameters may for instance form a set of one or more transmission parameters.

The server 110 may for instance generate a radio map for a radio node 140 of the venue, wherein the radio node 140 is configured with the (determined) set of one or more transmission parameters. For instance, the radio map may be generated based at least partially on one or more radio measurements and on one or more position information gathered for the radio node. For gathering the one or more radio measurements, the one or more radio nodes 140 of the venue are configured based on the set of one or more transmission parameters resulting in one or more signals being sent by the one or more radio nodes 140 of the venue according to the set of one or more transmission parameters (of the plurality of sets of one or more transmission parameters).

Further, each radio node 140 of the one or more radio nodes 140 of the venue may for instance broadcast its identifier information, which was provided to each radio node 140 of the one or more radio nodes 140, e.g. via at least one of the one or more hubs 130, e.g. by the server 110.

The broadcasted identifier information may for instance be obtained (e.g. received) by the one or more electronic devices 150. The one or more electronic devices 150 may for instance request position estimation, e.g. by a positioning request, wherein the positioning request may for instance comprise the identifier information obtained by the electronic device 150. According to the obtained identifier information of the request, a generated radio map associated with the identifier information may for instance be provided to the electronic device 150, e.g. by the server 110.

Figure 2:
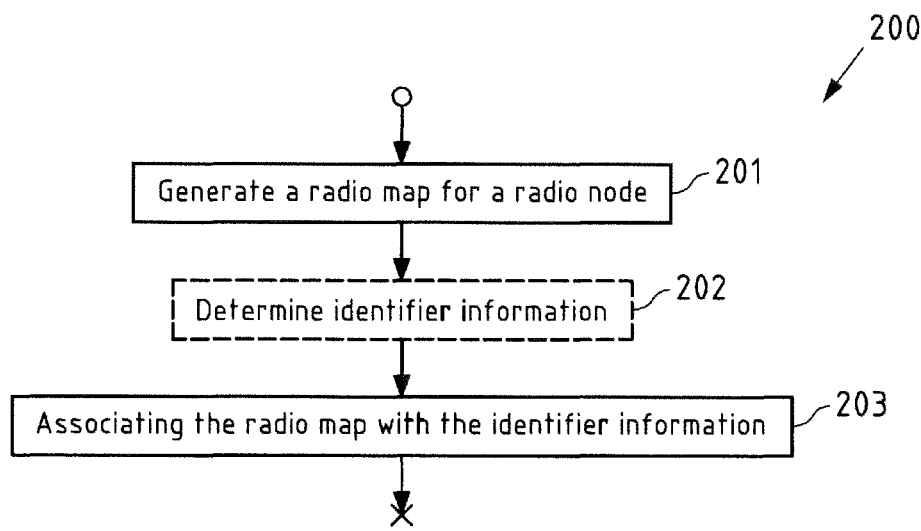
FIG. 2 a flowchart showing an example embodiment of a method according to the first exemplary aspect of the present invention, for instance performed by server 110 of FIG. 1.

FIG. 2 is a flowchart 200 showing an example embodiment of a method according to the first exemplary aspect of the present invention. This flowchart 200 may for instance be performed by server 110 of FIG. 1.

In a first step 201, a radio map for a radio node of a venue is generated. For instance, the radio node is configured with a set of one or more transmission parameters from a plurality of sets of one or more transmission parameters.

In an optional second step 202, identifier information for the radio node is determined. The identifier information is determined based on the set of one or more transmission parameters. Thus, the determined identifier information may be different from another identifier information, which is determined based on a further set of one or more transmission parameters, wherein the one or more transmission parameters comprised by the further set of one or more transmission parameters are different from the ones of the set of one or more transmission parameters used for determining the identifier information of optional step 202.

In a third step 203, the generated radio map is associated with the determined identifier information. Further, the association (and optionally the generated radio map and/or the determined identifier information) may for instance be outputted, e.g. to a memory for storing the generated radio map together with the determined identifier information.

Figure 3:
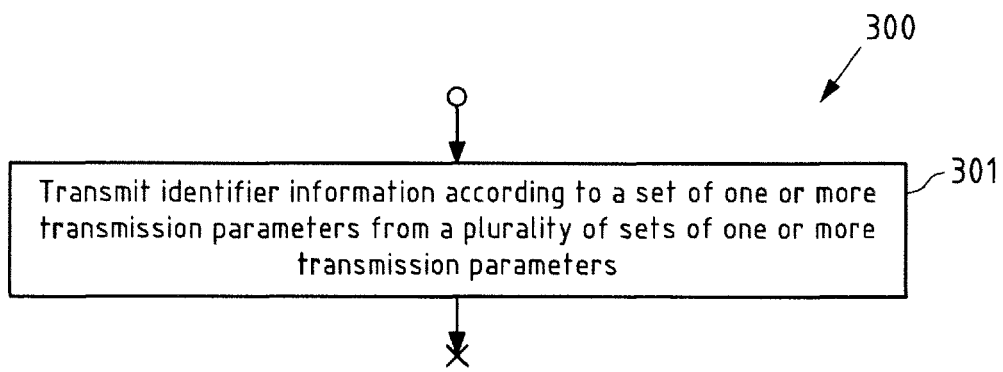
FIG. 3 a flowchart showing an example embodiment of a method according to the second exemplary aspect of the present invention, for instance performed by radio node 140 of FIG. 1.

FIG. 3 is a flowchart showing an example embodiment of a method according to the second exemplary aspect of the present invention. This flowchart 300 may for instance be performed by radio node 140 of FIG. 1.

In a first step 301, identifier information is transmitted according to a set of one or more transmission parameters from a plurality of sets of one or more transmission parameters.

Figure 4:
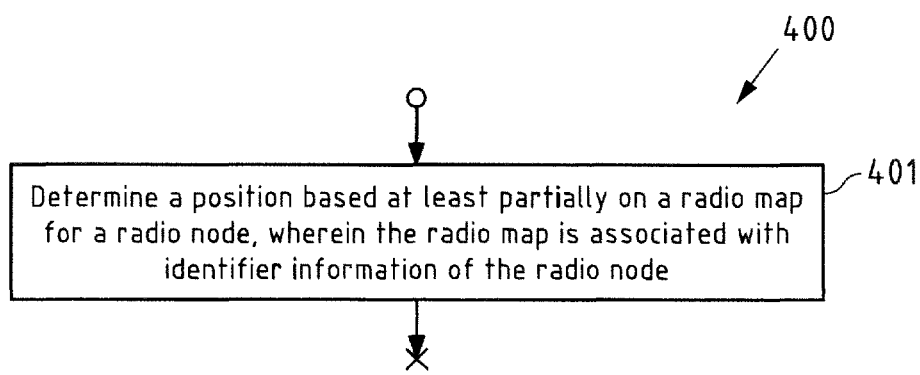
FIG. 4 a flowchart showing an example embodiment of a method according to the first exemplary aspect of the present invention, for instance performed by electronic device 150 of FIG. 1.

FIG. 4 is a flowchart showing an example embodiment of a method according to the third exemplary aspect of the present invention. This flowchart 400 may for instance be performed by electronic device 150 of FIG. 1.

In a first step 401, a position is determined based at least partially on a radio map for a radio node, wherein the radio map is associated with identifier information of the radio node.

Figure 5A:
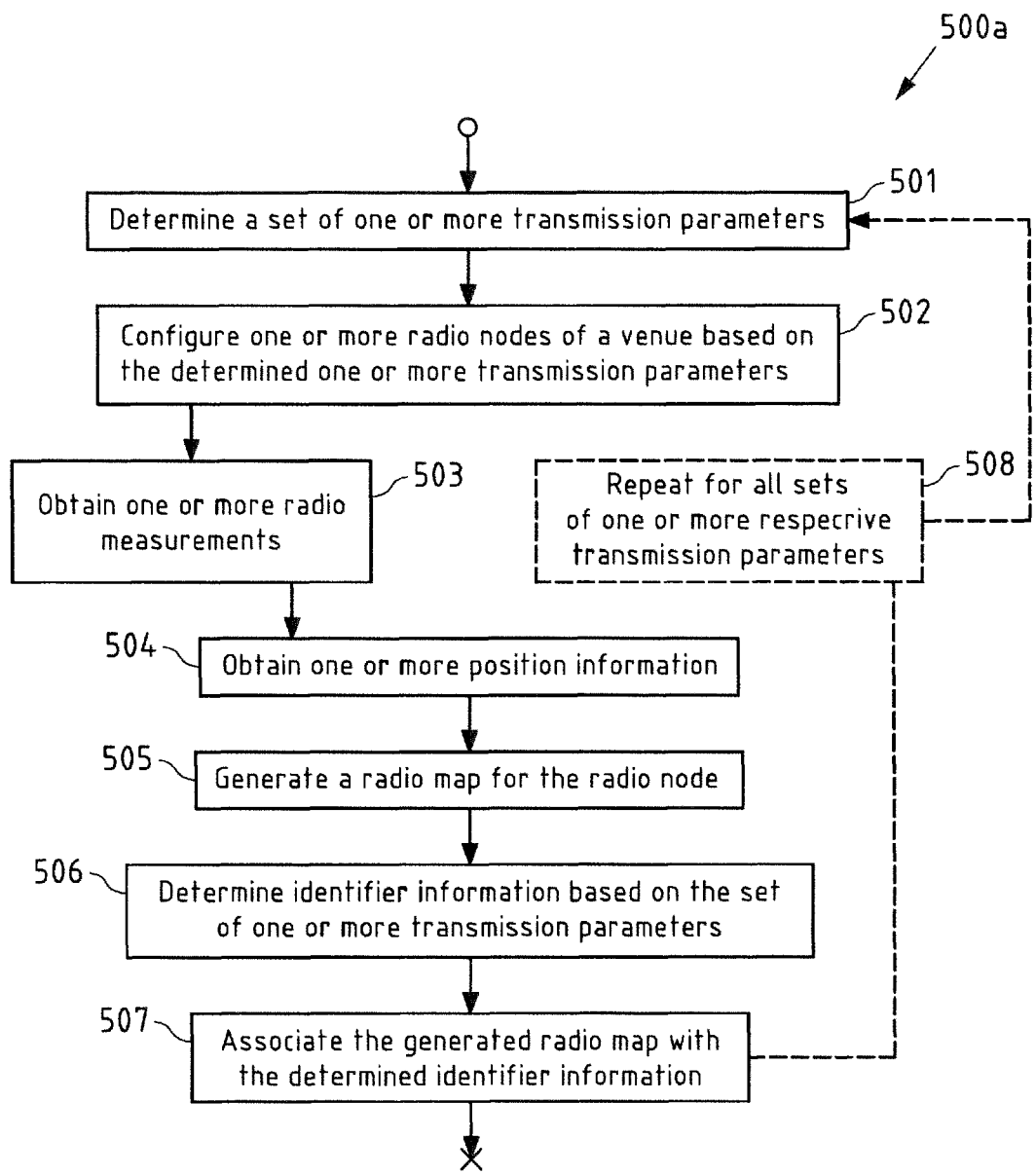
FIG. 5*a* a flowchart showing an example embodiment of a method according to the first and/or second aspect of the present invention, for instance performed by server 110 of FIG. 1.

FIG. 5a is a flowchart 500a showing an example embodiment of a method according to the first and/or second exemplary aspect of the present invention. This flowchart 500a may for instance be performed by server 110 of FIG. 1.

In a first step 501, a set of one or more transmission parameters is determined. The set of one or more transmission parameters may for instance comprise one or more of the following parameters: i) a transmission power parameter; ii) one or more transmission channel parameters; iii) a transmission interval parameter. The set of one or more transmission parameters may for instance be determined, e.g. by a server (e.g. server 110 of FIG. 1) monitoring and/or managing one or more radio nodes (e.g. radio nodes 140 of FIG. 1) of a venue.

In a second step 502, one or more radio nodes of the venue are configured based on the determined one or more 5 transmission parameters. The determined set of one or more 5 transmission parameters may for instance be transmitted (e.g. via a gateway hub (e.g. gateway hub 120 of FIG. 1) and/or further hubs (e.g. hubs 130 of FIG. 1)) to the one or more radio nodes. After the one or more radio nodes of the venue are configured based on the set of one or more transmission parameters, one or more signals are transmitted (e.g. sent) according to the one or more transmission parameters of the set of one or more transmission parameters by the one or more radio nodes of the venue.

In a third step 503, one or more radio measurements are obtained. The one or more radio measurements are e.g. received by the server (e.g. server 110 of FIG. 1), wherein prior to receiving the one or more radio measurements, the one or more radio measurements are gathered (e.g. measured), e.g. by the one or more radio nodes (e.g. radio nodes 140 of FIG. 1). After gathering the one or more radio measurements, the one or more radio nodes of the venue may for instance transmit the one or more radio measurements to the server, e.g. via hubs (e.g. hubs 130 of FIG. 1) and/or a gateway hub (e.g. gateway hub 120 of FIG. 1).

In a fourth step 504, one or more position information are obtained. The one or more position information may for instance be obtained by receiving the one or more position information. The one or more position information may for instance be received by the server. The one or more position information are indicative of one or more locations in the venue, wherein at these one or more locations in the venue the one or more radio measurements (see step 503) were gathered. The one or more position information may for instance be transmitted (e.g. sent) by the one or more radio nodes of the venue, which gathered the one or more radio measurements (see step 503).

In a fifth step 505, a radio map for the radio node of the venue is generated. The radio map is generated, e.g. by the server, based on the one or more radio measurements (see step 503) and the one or more position information (see step 504).

In a sixth step 506, identifier information is determined based on the set of one or more transmission parameters. The identifier information is determined for the radio node. The identifier information allows the radio node in the venue to be identified. At least a part of the determined identifier information depends on the set of one or more transmission parameters.

In a seventh step 507, the generated radio map is associated with the determined identifier information. The association of the generated radio map with the determined identifier information for the radio node may for instance be stored, e.g. in a memory (e.g. a database).

Optionally, step 508 indicates that the steps 501 to 507 may for instance be repeated for all respectively further sets of one or more transmission parameters. Otherwise, the method is finished. In this way, for each set of one or more transmission parameters of all (possible or pre-defined) sets of one or more transmission parameters (also referred to as the plurality of sets of one or more transmission parameters) a radio map for a radio node of the one or more radio nodes of the venue is generated. In case the venue comprises more than one radio nodes, for each of the more than one radio nodes one radio map may for instance be generated for each set of one or more transmission parameters of all sets of (possible) one or more transmission parameters.

Figure 5B:
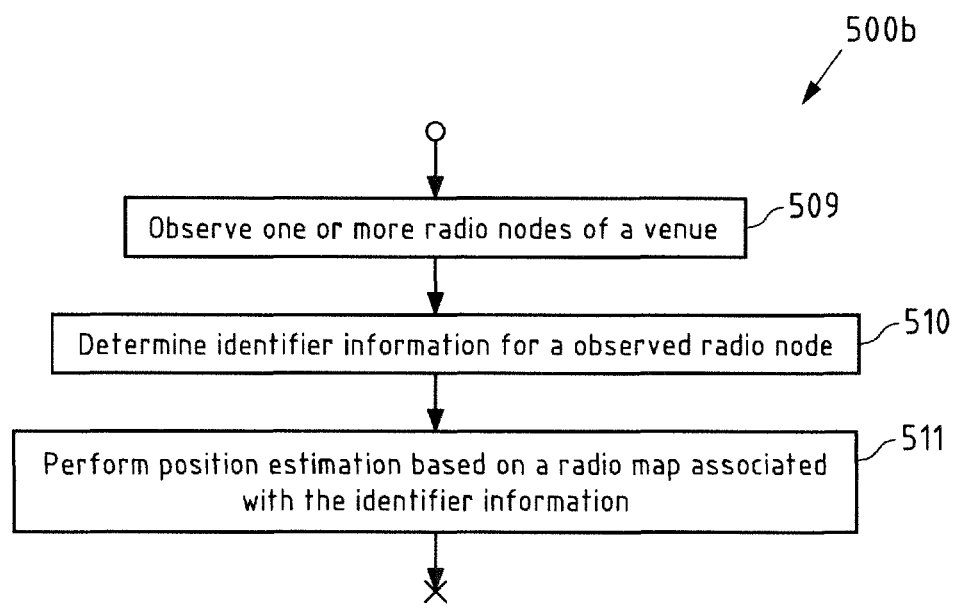
FIG. 5*b* a flowchart showing an example embodiment of a method according to the third exemplary aspect of the present invention, for instance performed by an electronic device 150 of FIG. 1.

FIG. 5b is a flowchart 500b showing an example embodiment of a method according to the third exemplary aspect of the present invention. This flowchart 500b may for instance be performed by one or more electronic devices 150 of FIG. 1.

In a first step 509, one or more radio nodes (e.g. radio nodes 140 of FIG. 1) of a venue are observed. For instance, the one or more radio nodes transmit a beacon comprising identifier information allowing the radio node, from which the beacon stems, to be identified.

In a second step 510, identifier information for an observed radio node of the venue is determined. The identifier information is determined, e.g. by analyzing the received beacon comprising the identifier information.

In a third step 511, position estimation is performed based on a radio map associated with the identifier information, wherein at least a part of the identifier information depends on a set of one or more transmission parameters from a plurality of sets of one or more transmission parameters. For instance, a positioning request for an indoor positioning and/or floor detection may be transmitted (e.g. sent) by the electronic device, e.g. to a server (e.g. server 110 of FIG. 1). The positioning request may for instance comprise the identifier information. Based on the identifier information, e.g. the server may provide the corresponding radio map (see step 505 of FIG. 5a) associated with the transmitted identifier information to the electronic device. Based on the provided radio map, the electronic device may perform position estimation to determine its position respectively location in the venue.

The electronic device may for instance not know about the set of one or more transmission parameters from the plurality of sets of one or more transmission parameters, wherein the identifier information of the radio node depends on said set of one or more transmission parameters from the plurality of sets of one or more transmission parameters (see step 506 of FIG. 5a).

The method according to the first and/or second and/or third exemplary aspect of the present invention utilizes the generated radio maps of the one or more radio nodes of the venue and their association with identifier information. Simply, the correct radio maps are provided to the electronic device for performing position estimation in indoor positioning and/or floor detection corresponding to an example method according to the first and/or second and/or third exemplary aspect of the present invention.

Figure 6:
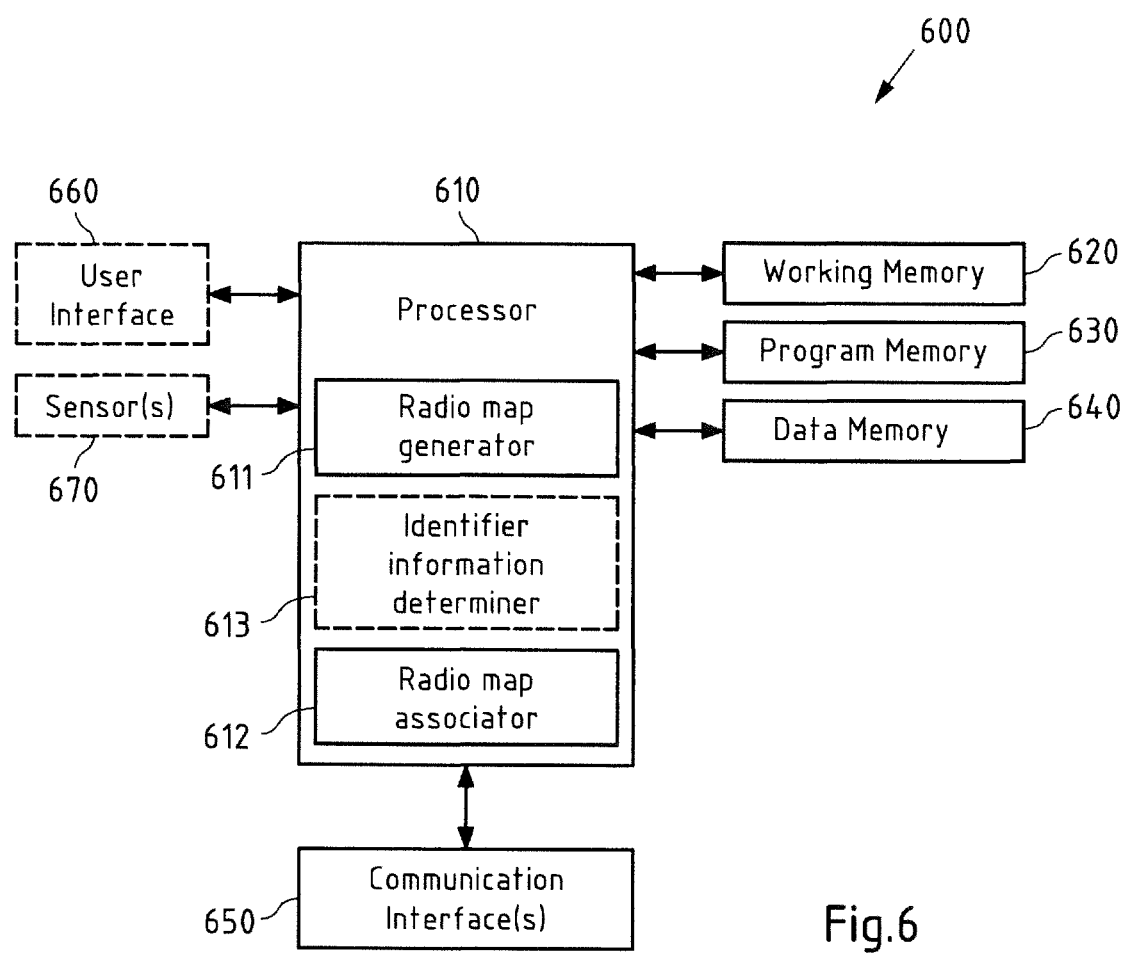
FIG. 6 a schematic block diagram of a first apparatus according to the first exemplary aspect of the present invention.

FIG. 6 is a schematic block diagram of an apparatus according to an exemplary aspect of the present invention, which may for instance represent server 110 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the first and/or second and/or third exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the first exemplary aspect of the invention.

Processor 610 may for instance comprise a radio map generator 611 as a functional and/or structural unit. Radio map generator 611 may for instance be configured to generate a radio map (see step 201 of FIG. 2). Processor 610 may for instance comprise a radio map associator 612 as a functional and/or structural unit. Radio map associator 612 may for instance be configured to associate a radio map with identifier information determine a piece of respective identifier information to be output (see step 203 of FIG. 2). Processor 610 may for instance comprise an optional identifier information determiner 613 as an optional functional and/or structural unit. Optional identifier information determiner 613 may for instance be configured to determine identifier information for a radio node (see step 202 of FIG. 2).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first and/or second and/or third exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more respective transmission parameters, one or more discrete values, a look-up table comprising one or more respective transmission parameters and one or more discrete values, wherein the one or more respective transmission parameters may for instance be associated with a discrete value of the one or more discrete values, and/or one or more generated respective radio maps, wherein the one or more generated respective radio map may for instance be associated with a piece of respective identifier information. In this way, a respective radio map may for instance be provided dependent upon one or more respective transmission parameters, based on which one or more respective radio nodes of a venue may be configured to use for a transmission of one or more signals.

Communication interface(s) 650 enable apparatus 600 to communicate with other entities, e.g. with one or more electronic devices 150 of FIG. 1, one or more hubs 130 of FIG. 1, gateway hub 120 of FIG. 1, and/or radio nodes 140 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise an accelerometer, a camera, or the like to name but a few non-limiting examples, e.g. to determine further pieces of information, which may for instance be used in a method according to the first and/or second and/or third exemplary aspect of the present invention.

Some or all of the components of the apparatus 600 may for instance be connected via a bus. Some or all of the components of the apparatus 600 may for instance be combined into one or more modules.

Figure 7:
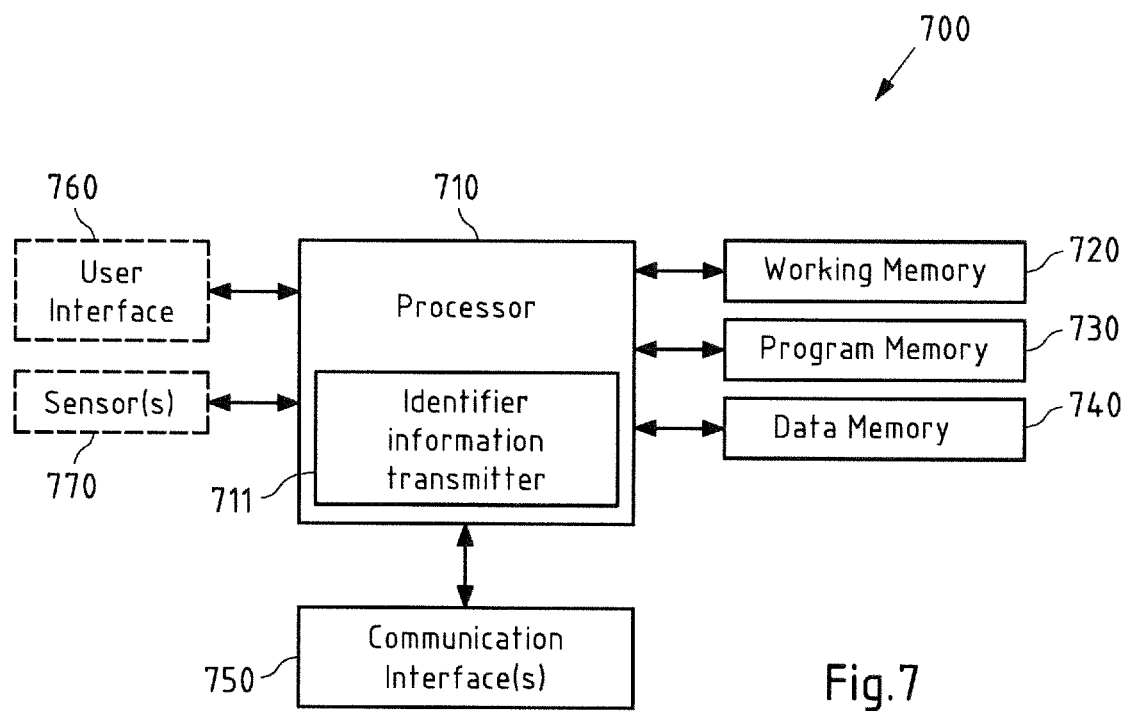
FIG. 7 a schematic block diagram of a second apparatus according to the second exemplary aspect of the present invention.

FIG. 7 is a schematic block diagram of an apparatus according to an exemplary aspect of the present invention, which may for instance represent radio node 140 of FIG. 1.

Apparatus 700 comprises a processor 710, working memory 720, program memory 730, data memory 740, communication interface(s) 750, an optional user interface 760 and an optional sensor(s) 770.

Apparatus 700 may for instance be configured to perform and/or control or comprise respective means (at least one of 710 to 770) for performing and/or controlling the method according to the first and/or second and/or third exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the second exemplary aspect of the invention.

Processor 710 may for instance comprise an identifier information transmitter 711 as a functional and/or structural unit. Identifier information transmitter 711 may for instance be configured to transmit identifier information (see step 301 of FIG. 3).

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the first and/or second and/or third exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more respective transmission parameters, one or more discrete values, a look-up table comprising one or more respective transmission parameters and one or more discrete values, wherein the one or more respective transmission parameters may for instance be associated with a discrete value of the one or more discrete values, and/or one or more generated respective radio maps, wherein the one or more generated respective radio map may for instance be associated with a piece of respective identifier information. In this way, a respective radio map may for instance be provided dependent upon one or more respective transmission parameters, based on which one or more respective radio nodes of a venue may be configured to use for a transmission of one or more signals.

Communication interface(s) 750 enable apparatus 700 to communicate with other entities, e.g. with one or more electronic devices 150 of FIG. 1, one or more hubs 130 of FIG. 1, gateway hub 120 of FIG. 1, and/or radio nodes 140 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet.

User interface 760 is optional and may comprise a display for displaying information to a user and/or an input device (e.g. a keyboard, keypad, touchpad, mouse, etc.) for receiving information from a user.

Sensor(s) 770 are optional and may for instance comprise an accelerometer, a camera, or the like to name but a few non-limiting examples, e.g. to determine further pieces of information, which may for instance be used in a method according to the first and/or second and/or third exemplary aspect of the present invention.

Some or all of the components of the apparatus 700 may for instance be connected via a bus. Some or all of the components of the apparatus 700 may for instance be combined into one or more modules.

Figure 8:
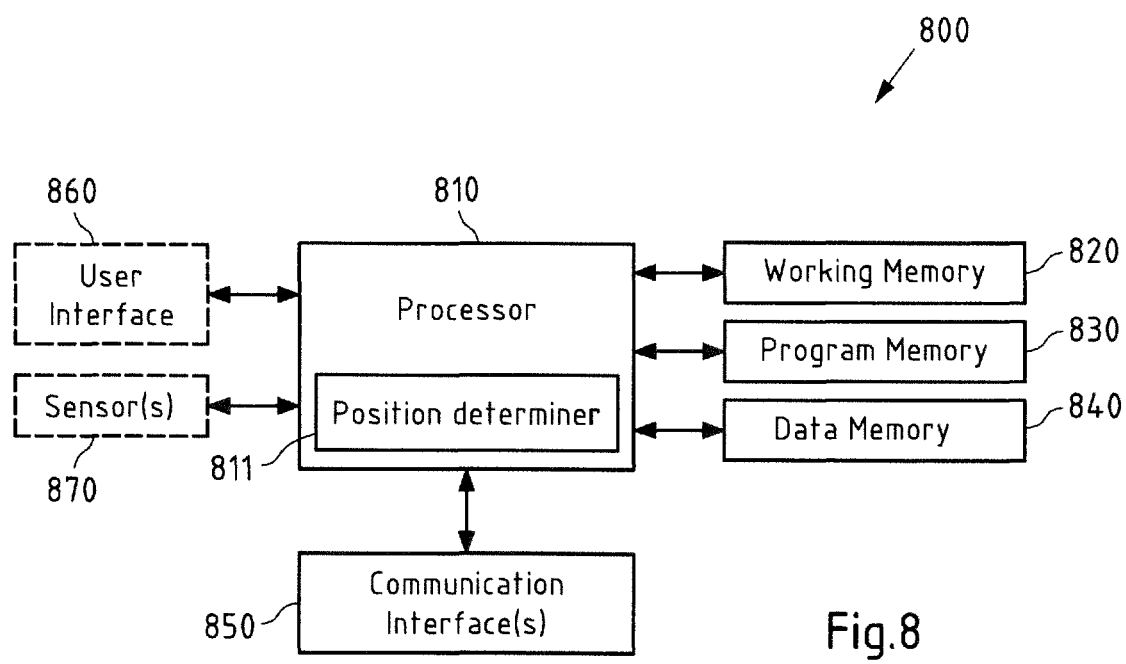
FIG. 8 a schematic block diagram of a third apparatus according to the third exemplary aspect of the present invention.

FIG. 8 is a schematic block diagram of an apparatus according to an exemplary aspect of the present invention, which may for instance represent electronic device 150 of FIG. 1.

Apparatus 800 comprises a processor 810, working memory 820, program memory 830, data memory 840, communication interface(s) 850, an optional user interface 860 and an optional sensor(s) 870.

Apparatus 800 may for instance be configured to perform and/or control or comprise respective means (at least one of 810 to 870) for performing and/or controlling the method according to the first and/or second and/or third exemplary aspect. Apparatus 800 may as well constitute an apparatus comprising at least one processor (810) and at least one memory (820) including computer program code, the at least one memory and the computer program code configured to, with the at least one processor, cause an apparatus, e.g. apparatus 800 at least to perform and/or control the method according to the third exemplary aspect of the invention.

Processor 810 may for instance comprise a position determiner 811 as a functional and/or structural unit. Position determiner 811 may for instance be configured to determine a position (see step 401 of FIG. 4).

Processor 810 may for instance further control the memories 820 to 840, the communication interface(s) 850, the optional user interface 860 and the optional sensor(s) 870.

Processor 810 may for instance execute computer program code stored in program memory 830, which may for instance represent a computer readable storage medium comprising program code that, when executed by processor 810, causes the processor 810 to perform the method according to the first and/or second and/or third exemplary aspect.

Processor 810 (and also any other processor mentioned in this specification) may be a processor of any suitable type. Processor 810 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 810 may for instance be an application processor that runs an operating system.

Program memory 830 may also be included into processor 810. This memory may for instance be fixedly connected to processor 810, or be at least partially removable from processor 810, for instance in the form of a memory card or stick Program memory 830 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 830 may also comprise an operating system for processor 810. Program memory 830 may also comprise a firmware for apparatus 800.

Apparatus 800 comprises a working memory 820, for instance in the form of a volatile memory. It may for instance be a Random Access Memory (RAM) or Dynamic RAM (DRAM), to give but a few non-limiting examples. It may for instance be used by processor 810 when executing an operating system and/or computer program.

Data memory 840 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 840 may for instance store one or more respective transmission parameters, one or more discrete values, a look-up table comprising one or more respective transmission parameters and one or more discrete values, wherein the one or more respective transmission parameters may for instance be associated with a discrete value of the one or more discrete values, and/or one or more generated respective radio maps, wherein the one or more generated respective radio map may for instance be associated with a piece of respective identifier information. In this way, a respective radio map may for instance be provided dependent upon one or more respective transmission parameters, based on which one or more respective radio nodes of a venue may be configured to use for a transmission of one or more signals.

Communication interface(s) 850 enable apparatus 800 to communicate with other entities, e.g. with one or more electronic devices 150 of FIG. 1, one or more hubs 130 of FIG. 1, gateway hub 120 of FIG. 1, and/or radio nodes 140 of FIG. 1. The communication interface(s) 850 may for instance comprise a wireless interface, e.g. a cellular radio communication interface and/or a WLAN interface) and/or wire-bound interface, e.g. an IP-based interface, for instance to communicate with entities via the Internet.

User interface 860 is optional and may comprise a display for displaying information to a user and/or an input device (e.g. a keyboard, keypad, touchpad, mouse, etc.) for receiving information from a user.

Sensor(s) 870 are optional and may for instance comprise an accelerometer, a camera, or the like to name but a few non-limiting examples, e.g. to determine further pieces of information, which may for instance be used in a method according to the first and/or second and/or third exemplary aspect of the present invention.

Some or all of the components of the apparatus 800 may for instance be connected via a bus. Some or all of the components of the apparatus 800 may for instance be combined into one or more modules.

The following embodiments shall also be considered to be disclosed: One use case for radio node (e.g. beacon) management is changing the radio node transmission (Tx) parameters (Tx power, Tx channels, and Tx interval, for instance how often a radio node transmits an advertisement packet that notifies nearby devices about the radio node existence and on which channels). However, once one or both, or all parameters are changes, the radio signal characteristics is changed, and, hence, the radio map collected earlier for the radio node is no longer valid. Thus, if the radio map collected when the beacon operated with the previous parameters is used when radio node in fact operates with the new parameters, positioning performance will be low.

When the radio node Tx power, Tx interval or Tx channel changes, the radio map created for the previous parameters is no longer valid. This is because the increased Tx power changes the power levels observed throughout the radio node coverage area. Moreover, when the Tx power increases (decreases) the radio node coverage area expands (contracts). Therefore, a new radio map is clearly necessary. The increased (or decreased) Tx interval may have an impact on the interference environment and, thus, also an impact to the radio map. Similarly, different Tx channels (different frequencies) may propagate a little bit differently leading to different signal strength patterns depending upon which channel is used.

Now, a radio node has two identities: static physical address is the MAC address and on the logical level a radio node is identified by e.g. a Beacon ID (Eddystone: Namespace & Instance ID; iBeacon: UUID & Major ID & Minor ID). As the latter one is freely configurable, it is advantageous to change the Beacon ID, when the Tx parameters change. The physical radio node is the same (MAC address not changed), but the logical ID gets changed.

When the radio node radio map is tied to the logical Beacon ID instead of the radio node MAC address, changing the logical Beacon ID automatically allocates a separate radio map for the new logical Beacon ID, although the physical radio node is the same. This feature can be used to isolate different sets of Tx parameters from each other in the radio map level: for each radio node have one Beacon ID related to one Tx parameter set, and another Beacon ID for another set of Tx parameters.

Therefore, because it is known that the radio signal field created by the radio node changes, when the Tx parameters change, it is advantageous to change the radio node logical Beacon ID, whenever the Tx parameters change. This way separate radio node radio maps get created for different Tx parameter sets.

The workflow may be as follows:
When setting up an indoor positioning system:
collect radio data with the first configuration;
reconfigure radio nodes to use another Tx parameter set
radio nodes IDs change (manual or automatic);
collect radio data with the second configuration
new set of radio node radio maps generated automatically
(repeat for all the Tx parameter sets to be used).
Notice that the positioning system itself does not need to know about the reconfiguration:
Once the Tx parameters change and the Beacon IDs get changed at the same time, new radio node radio maps will be created automatically. This, hence, isolates the previous configuration from the new one in the radio map level.
In the Positioning Phase:
The device to be positioned observes radio nodes with certain logical IDs. The algorithms utilize the radio maps associated with those beacon IDs.
device does not need to know the Tx parameters; the algorithms simply pick the correct radio maps using the logical IDs.
Notes:
The system must remember the Beacon IDs used for different configurations for each radio node. This is because when the radio node Tx parameters are changed after the setup phase so that the radio maps corresponding to the particular Tx parameter set are correctly found from the database during the positioning phase.

About Beacon IDs:

The beacon IDs are defined as follows for e.g. Google's Eddystone and Apple's iBeacon radio nodes (e.g. beacons):

| Eddystone: | | |
|---|---|---|
| Namespace | 10 bytes | Identifies e.g. the company or the owner of the radio node |
| Instance ID | 6 bytes | Identifies the radio node belonging to the namespace |
| iBeacon: | | |
| UUID | 16 bytes | Identifies e.g. the company or the owner of the radio node |
| Major ID | 2 bytes | Identifies a group of radio nodes; can be e.g. a building or floor(s) |
| Minor ID | 2 bytes | Identifies the radio node in the group |

Advantage(s):

The described mechanism provides as straightforward way to utilize multiple radio node Tx configurations for different use cases in the building.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, performed by at least one apparatus, comprising: generating a radio map for a radio node, wherein the radio node is configured with a set of one or more transmission parameters from a plurality of sets of one or more transmission parameters, and wherein the radio node is configured to transmit one or more signals in accordance with the set of one or more transmission parameters; and associating the radio map with identifier information, wherein at least a part of the identifier information depends on the set of one or more transmission parameters from the plurality of sets of one or more transmission parameters, wherein:

the set of one or more transmission parameters from the plurality of sets of one or more transmission parameters comprise one or more of i) a transmission power parameter; ii) one or more transmission channel parameters; or iii) a transmission interval parameter, and at least a part of the identifier information comprises ownership information, wherein the ownership information is indicative of one or more radio nodes of a company or an owner of the one or more radio nodes, and at least another part of the identifier information comprises instance information, wherein the instance information is indicative of an identification of a radio node of the one or more radio nodes of the company or the owner of the one or more radio nodes.

2. The method according to claim 1, the method further comprising:

determining the identifier information based on the set of one or more transmission parameters from the plurality of sets of one or more transmission parameters, wherein the identifier information allows the radio node of the venue to be identified.

3. The method according to claim 1, wherein the instance information is divided into a plurality of upper bits and a plurality of lower bits.

4. The method according to claim 1, wherein the set of one or more transmission parameters from the plurality of sets of one or more transmission parameters is associated with a discrete value, wherein the set of one or more transmission parameters of the plurality of sets of one or more transmission parameters comprises a combination of more than one transmission parameters, and wherein the discrete value is indicative of a value from a finite number of values.

5. The method according to claim 4, wherein the identifier information comprises the discrete value.

6. A method, performed by at least one apparatus, comprising:
- determining a position based at least partially on a radio map for a radio node that is configured according to a set of one or more transmission parameters from a plurality of sets of one or more transmission parameters, wherein the radio node is configured to transmit one or more signals in accordance with the set of one or more transmission parameters, wherein the radio map is associated with identifier information allowing the radio node of the venue to be identified, and wherein at least a part of the identifier information depends on the set of one or more transmission parameters from the plurality of sets of one or more transmission parameters, wherein:
- the set of one or more transmission parameters from the plurality of sets of one or more transmission parameters comprise one or more of i) a transmission power parameter; ii) one or more transmission channel parameters; or iii) a transmission interval parameter, and
- at least a part of the identifier information comprises ownership information, wherein the ownership information is indicative of one or more radio nodes of a company or an owner of the one or more radio nodes, and at least another part of the identifier information comprises instance information, wherein the instance information is indicative of an identification of a radio node of the one or more radio nodes of the company or the owner of the one or more radio nodes.

7. The method according to claim 6, wherein the position is determined further based on one or more radio measurements gathered by an apparatus whose position is to be determined.

8. The method according to claim 6 wherein the instance information is divided into a plurality of upper bits and a plurality of lower bits.

9. The method according to claim 6, wherein the set of one or more transmission parameters from the plurality of sets of one or more transmission parameters is associated with a discrete value, wherein the set of one or more transmission parameters of the plurality of sets of one or more transmission parameters comprises a combination of more than one transmission parameters, and wherein the discrete value is indicative of a value from a finite number of values.

10. An apparatus comprising at least one processor and at least one memory including computer program code, the at least one memory and the computer program code configured to, with the at least one processor, cause the apparatus to at least perform:
- generating a radio map for a radio node, wherein the radio node is configured with a set of one or more transmission parameters from a plurality of sets of one or more transmission parameters, and wherein the radio node is configured to transmit one or more signals in accordance with the set of one or more transmission parameters; and
- associating the radio map with identifier information, wherein at least a part of the identifier information depends on the set of one or more transmission parameters from the plurality of sets of one or more transmission parameters wherein at least a part of the identifier information comprises ownership information, wherein the ownership information is indicative of one or more radio nodes of a company or an owner of the one or more radio nodes, and at least another part of the identifier information comprises instance information, and wherein the instance information is indicative of an identification of a radio node of the one or more radio nodes of the company or the owner of the one or more radio nodes and the instance information is divided into a plurality of upper bits and a plurality of lower bits.

11. The apparatus according to claim 10, the at least one memory and the computer program code configured to, with the at least one processor, cause the apparatus further to perform:
- determining the identifier information based on the set of one or more transmission parameters from the plurality of sets of one or more transmission parameters, wherein the identifier information allows the radio node of the venue to be identified.

12. The apparatus according to claim 10, wherein the set of one or more transmission parameters from the plurality of sets of one or more transmission parameters comprise one or more of the following parameters i) to iii):
- i) a transmission power parameter;
- ii) one or more transmission channel parameters; or
- iii) a transmission interval parameter.

13. The apparatus according to claim 10, wherein the set of one or more transmission parameters from the plurality of sets of one or more transmission parameters is associated with a discrete value, wherein the set of one or more transmission parameters of the plurality of sets of one or more transmission parameters comprises a combination of more than one transmission parameters, and wherein the discrete value is indicative of a value from a finite number of values.

14. The apparatus according to claim 13, wherein the identifier information comprises the discrete value.

* * * * *